United States Patent Office 3,292,675
Patented Dec. 20, 1966

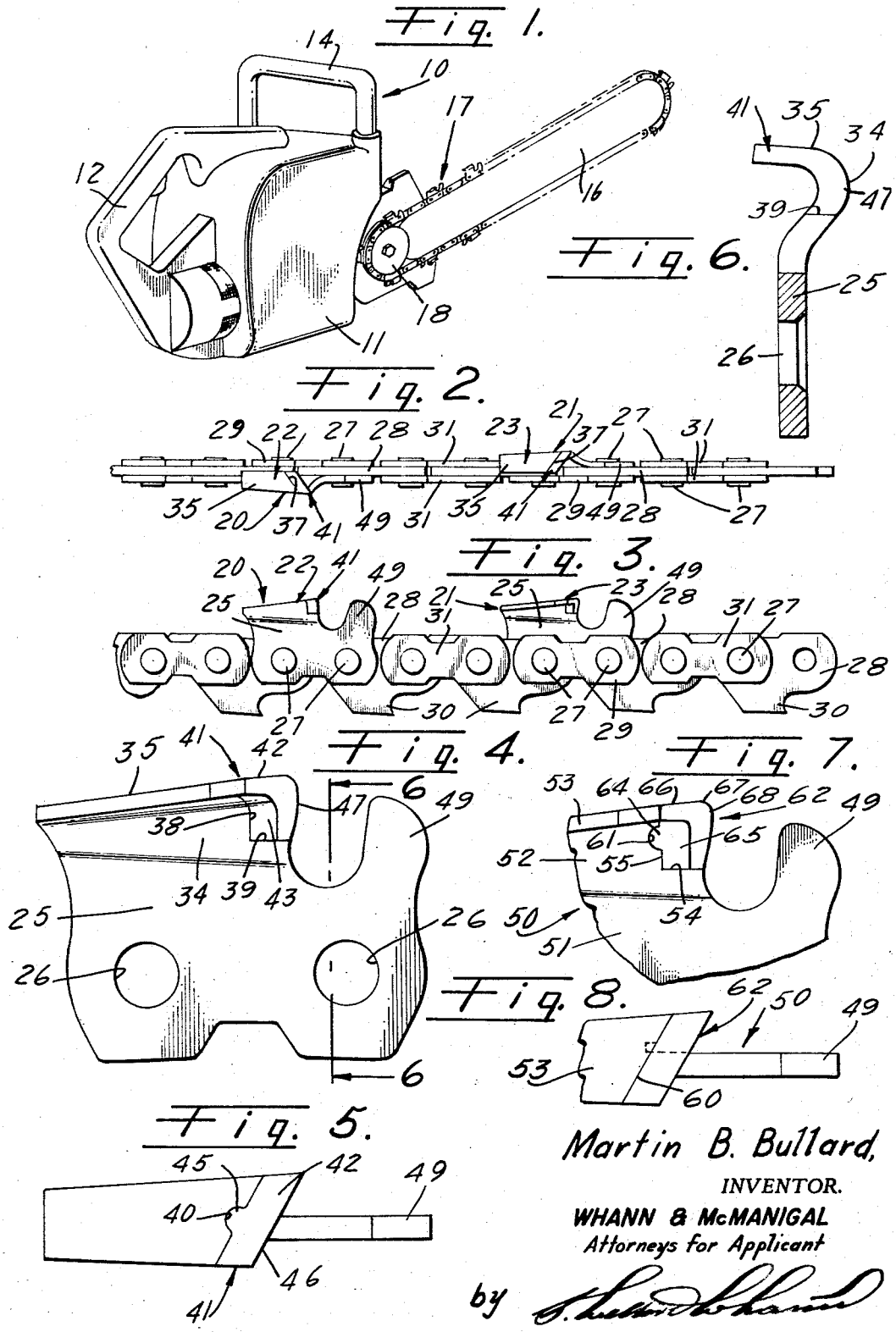

3,292,675
CUTTER ELEMENTS FOR CHAIN SAWS
Martin B. Bullard, Los Angeles, Calif., assignor to McCulloch Corporation, Los Angeles, Calif., a corporation of Wisconsin
Filed Sept. 18, 1964, Ser. No. 397,506
7 Claims. (Cl. 143—135)

This invention relates generally to chain saws and relates more particularly to the cutter or cutting elements or teeth.

As is well known, the cutting elements or teeth of most of the saw chains presently in use wear rather rapidly and hence require frequent sharpening. Generally the saw chains, when the teeth become dull, must be taken to a place having sharpening equipment and considerable time is lost while the teeth are being sharpened. Even when a saw chain can be and is sharpened in the field, considerable time is lost from actual cutting operations. Sharpening is often necessary at least once a day.

Therefore an object of the invention is to provide cutting teeth for saw chains having cutting edges that will cut a variety of different materials, including wood from the softest to the hardest types, pumice stone (volcanic stone), brick, tile, asbestos cement board and pipe, stucco, frame house structures, and most types of roof structure (wood shingles, stone on top of built-up roofs).

It has been found by actual usage that the saw chain with these cutting teeth can be used on the various materials above listed and then cut wood in the normal manner without requiring touching up or sharpening.

It is therefore another object of the invention to provide chain saw teeth having cutting tip parts of extremely hard material, such as carbide, boron hydride or diamond, which conform to the contour of the standard saw chain teeth.

Still another object of the invention is to provide saw chain teeth having hard cutting parts or tips which follow the contour of the leading ends of the teeth and have the backing of the teeth.

A further object of the invention is to provide chain saw teeth of this character wherein the cutting tip parts thereof are so fabricated or secured to the cutter links as to resist being separated therefrom by even severe impacts.

It is a still further object of the invention to provide a saw chain of this character that is easy to sharpen.

Still another object of the invention is to provide a saw chain of this character that is economical to manufacture.

The characteristics and advantages of the invention are further sufficiently referred to in connection with the following detailed description of the accompanying drawings, which illustrate several embodiments. After considering these examples, skilled persons will understand that many variations may be made without departing from the principles disclosed, and I contemplate the employment of any structures, arrangements or modes of operation that are properly within the scope of the appended claims.

Referring to the drawings, which are for illustrative purposes only:

FIG. 1 is a perspective view of a chain saw having a saw chain with teeth embodying the present invention;

FIG. 2 is an enlarged top plan view of a section of such chain;

FIG. 3 is a side view of said section of such chain;

FIG. 4 is an enlarged side view of a cutter link with a cutting tooth of an alternative arrangement;

FIG. 5 is a top plan view of the same;

FIG. 6 is a sectional view taken on line 6—6 of FIG. 4;

FIG. 7 is a fragmentary view of another alternative arrangement; and

FIG. 8 is a top plan view of the alternative arrangement of FIG. 6.

Referring more particularly to FIG. 1, there is shown a chain saw, indicated generally at 10, having an engine, not shown, mounted in a housing 11 having the usual handles 12 ad 14. There is also a saw bar or blade 16 of the usual well known character on which is operably mounted a saw chain, indicated generally at 17. A saw chain driving sprocket 18 is operably mounted at the rear end of the bar 16 and is driven by the engine in the usual well known manner to drive the chain 17.

Referring to FIGS. 2 and 3, there is shown a section of a saw chain which has cutting elements on cutter links incorporated in the chain. The cutter links are indicated generally at 20 and 21 in longitudinally spaced relationship in the chain and said links carry respective cutters or teeth, indicated generally at 22 and 23 respectively, that are allochirally arranged in the chain. Except that the teeth or cutter elements are of opposite hand, the cutter or cutter element links, are of the same construction and shape and hence a description of one will be sufficient.

The links carrying the cutters are side links and include a body portion 25 having openings 26 adjacent the ends thereof for reception of pintles 27 which pivotally connect the cutter links with adjacent center links 28 and respective side links 29 oppositely arranged from the cutter links. The center links 28 have the usual sprocket drive lugs 30 and adjacent ends of adjacent center links are connected together by side links 31, these parts being articulately or pivotally connected together in the usual manner by means of pintles 27.

In the arrangement shown in FIGS. 4, 5 and 6 the cutter links have an outwardly extending side portion 34 that is inclined laterally from the upper part of the link body. Side portion 34 curves laterally outwardly and carries at its outward edge a top or transverse plate portion 35 which first curved inwardly and then flattens extending transversely inwardly relative to the center line of the chain to slightly beyond the center line so that there is an overlapping of the paths of the inner free edges of the teeth or cutter elements so that between the allochirally arranged teeth the kerf will be cut its full width.

The leading or forward end 37 of the plate 35 is diagonally arranged relative to the plane of the center line of the chain, the forward end 37 being inclined inwardly and rearwardly from the outer side of the cutter element. The side portion or web 34 of the cutter link is notched at its forward or leading end, said notch having a rear shoulder 38 and a bottom shoulder 39, shoulder 38 defining the rear end of the notch and said shoulder merges at its upper end with the adjacent end of the plate 35. This end of the plate 35 is provided with a rearwardly extending notch 40.

A tip, indicated generally at 41, of a very hard material, such as carbide, for example, is provided at the forward or leading end of the cutter element or tooth, said tip including a top portion 42 and a downwardly extending portion 43 at the outer end of the top portion 42. The tip is shaped to conform to the shape of the forward end of the top plate and side portion or web 34 and the rear edge of the tip conforms to the shape of the forward end of the cutter element; that is, the forward end of the plate 35 and the shoulder 38 which comprises the forward end of the major portion of the side portion or web 34. The rear end of the tip also includes a tongue 45 which fits into the notch 40 of the top plate 35. It is to be noted that the forward end or edge 46 of the top portion 42 of the tip is substantially parallel to the forward end of the plate 35 and is ground or otherwise formed to provide a sharp cutting edge which also extends downwardly along the forward edge of the downwardly extending portion of the tip, as indicated at 47. The tip 41 is secured to the forward end of the plate 35 and web 34 by any well known means, such as brazing, or by means of silver solder or the like. Any other suitable means may also be employed for securing the tip to the adjacent portion of the cutter.

The tip is coextensive with the forward end of the plate 35 and the portion of the web above shoulder 39 and is fully backed by these parts. The arrangement of the tongue 45 and grove 40 provides locking means additionally securing the tip 41 to the cutter link.

Spaced forwardly of the carbide tipped cutter of the cutter link is a depth gauge 49 which is of the usual well known character, which may remain constant for the life of the cutter.

Referring to FIGS. 7 and 8, there is shown an alternative arrangement of a cutter link, which is indicated generally at 50. This link includes a body portion 51 which has the pintel openings, not shown, and at the outer or upper edge of the body portion 51 there is an outwardly extending side portion 52 that is inclined laterally toward the outer edge, as in the previously described cutter links, and at its outer edge there is a top or transverse plate portion 53 which extends inwardly relative to the center line of the chain and slightly beyond said center line so that there is an overlapping of the paths of the inner free edges of the allochirally arranged teeth or cutter elements.

At the forward ends of the side portion 52 and plate 53 said portions are notched in a manner similar to the notching of the arrangement first described and said notching provides a bottom shoulder 54 that is but slightly inclined relative to a line through the centers of the pintel openings and a generally vertical shoulder 55 defining the rear portion of the notch in the side portion 52. The forward end 60 of the plate 53 is diagonally inclined, as in the arrangement hereinabove described and particularly shown in FIGS. 2 and 5, the forwardmost part of the inclined end 60 joining the upper end of the vertical shoulder 55. There is a recess 61 in the vertical shoulder 55 intermediate the ends thereof.

A tip, indicated generally at 62, of hard material, such as carbide or the like, is brazed, soldered, or otherwise secured to the side portion or web 52 and plate 53. The tip 62 is similar to the tip 41 except that tip 62 has a tongue 64 in the depending portion 65 of the tip, said tongue being received within the recess 61. The tip 62 also includes a portion 66 which constitutes an extension of the plate 53 and which has a cutting edge 67 at the forward end thereof. The cutting edge 67 of this tip is formed by grinding the underside of the tip inwardly and rearwardly to thereby leave said sharp cutting edge. This part of the tip 62 is the same as the corresponding part of the tip 41.

In the arrangement of FIGS. 2 and 3 the arrangement is such that the tip, indicated generally at 70, is of a hard material, such as carbide or the like. The link of this arrangement is of the same character as the links of FIGS. 4 to 8 hereinabove described, except that there is no recess and tongue arrangements as in the previously described arrangements. The carbide tip 70 of the arrangement of FIGS. 2 and 3 fits into the notch of the web portion of the cutter link and the rear edge of the tip 70 forms continuations of the web and top plate. The lower edge 72 of the depending portion 73 of the tip 70 rests on or abuts against the shoulder defining the bottom of the notch for the tip 70 and said tip 70 is secured in the notch by welding, brazing, soldering, or the like. Tip 70 also has a sharp cutting edge at the forward end thereof, said edge being indicated at 74 and being of similar character to the corresponding edges in the other arrangements hereinabove described.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and I do not wish to be restricted to the specific forms shown or uses mentioned except as defined in the accompanying claims, wherein various portions have been separated for clarity of reading and not for emphasis.

I claim:
1. A cutter link for saws chains of chain saws, said link comprising:
   (a) a flat, vertical body portion forming a link plate and having a forward and rearward end;
   (b) a web extending vertically and laterally outwardly from a portion of the upper end of said body portion;
   (c) a top plate extending from the outer part of said web and extending laterally inwardly and transversely over and beyond said body portion, terminating in a free end;
   (d) a notch in the forward portion of said web and top plate;
   (e) an L-shaped carbide tip having a top leg and a side leg conforming to said top plate and web, respectively, at said notch,
   (f) said tip disposed and secured in said notch,
   (g) said tip being fully backed by said top plate and web; and
   (h) a forward edge on the outer portion of said top leg and on the laterally outer portion of said side leg of said tip forming a continuous forward cutting edge.

2. A cutter link as defined in claim 1, including:
   (a) a front face in said notch on said top plate being in abutment with said top leg, and
   (b) said web being in abutment with said side leg.

3. A cutter link as defined in claim 2, including:
   (a) said web and said side leg of said tip having flush outer surfaces forming a continuous outer surface trailing laterally inwardly, and
   (b) said top plate and said top leg of said tip having flush outer surfaces forming an outer continuous surface trailing inwardly toward said body portion.

4. A cutter link as defined in claim 3, including:
   (a) said web and said side leg of said tip having flush inner surfaces forming an inner continuous surface, and
   (b) said top plate and said top leg of said tip having flush inner surfaces forming an inner continuous surface, the free end of said top plate having a longitudinally directed edge flush with a corresponding edge on said top leg of said tip forming a continuous edge surface adjoining the outer continuous surface formed by the outer surfaces of said top plate and said top leg of said tip.

5. A cutter link as defined in claim 4, including: said forward edge of said top leg substantially parallel to said front face on said top plate.

6. A cutter link as defined in claim 5, including: said web curving outwardly adjacent its outer part and said top plate extending from the outer part of the web reversely curving from said web so as to extend laterally inwardly.

7. A cutter link as defined in claim 6, including: a depth gauge spaced forwardly of said tip and extending vertically outwardly from the forward end of said body portion a predetermined amount relative to the depth of cut to be made by the forward edge on said top leg.

References Cited by the Examiner

UNITED STATES PATENTS

| | | | |
|---|---|---|---|
| 1,974,215 | 7/1934 | Kilmer | 29—95 |
| 2,744,548 | 5/1956 | Stephenson et al. | 143—135.7 |
| 2,974,695 | 3/1961 | Pfeffer | 143—133.2 |

DONALD R. SCHRAN, *Primary Examiner.*